US012791425B2

(12) United States Patent
Shiomi et al.

(10) Patent No.: US 12,791,425 B2
(45) Date of Patent: Nov. 10, 2026

(54) VIBRATION TEST JIG

(71) Applicant: IHI Corporation, Tokyo (JP)

(72) Inventors: Kensuke Shiomi, Tokyo (JP); Teruyoshi Otoyo, Tokyo (JP); Takaomi Inada, Tokyo (JP)

(73) Assignee: IHI Corporation, Tokyo (JP)

( * ) Notice: Subject to any disclaimer, the term of this patent is extended or adjusted under 35 U.S.C. 154(b) by 311 days.

(21) Appl. No.: 18/751,431

(22) Filed: Jun. 24, 2024

(65) Prior Publication Data

US 2024/0344923 A1 Oct. 17, 2024

Related U.S. Application Data

(63) Continuation of application No. PCT/JP2022/034877, filed on Sep. 20, 2022.

(30) Foreign Application Priority Data

Jan. 14, 2022 (JP) ................................ 2022-004180

(51) Int. Cl.
*G01M 7/02* (2006.01)
*B64F 5/60* (2017.01)

(52) U.S. Cl.
CPC ............... *G01M 7/027* (2013.01); *B64F 5/60* (2017.01)

(58) Field of Classification Search
CPC ........ G01N 3/00-62; G01N 15/00-14; G01M 7/00-08
See application file for complete search history.

(56) References Cited

U.S. PATENT DOCUMENTS

| | | | | |
|---|---|---|---|---|
| 8,650,961 | B2 * | 2/2014 | Hanoomanjee | B25B 5/14 73/11.04 |
| 11,761,866 | B2 * | 9/2023 | Charron | G01N 3/04 73/802 |
| 11,815,425 | B2 * | 11/2023 | Shiomi | G01M 15/14 |
| 2011/0179877 | A1 | 7/2011 | Hanoomanjee et al. | |
| 2022/0026310 | A1 | 1/2022 | Shiomi et al. | |
| 2024/0361205 | A1 * | 10/2024 | Shiomi | G01M 7/027 |

FOREIGN PATENT DOCUMENTS

| | | | |
|---|---|---|---|
| CN | 109029889 | A | 12/2018 |
| JP | 2003-270081 | A | 9/2003 |
| JP | 2012-137054 | A | 7/2012 |
| WO | WO 2020/208925 | A1 | 10/2020 |

OTHER PUBLICATIONS

International Search Report issued Nov. 8, 2022 in PCT/JP2022/034877 filed on Sep. 20, 2022, 2 pages.

* cited by examiner

*Primary Examiner* — Judy Nguyen
*Assistant Examiner* — James Split
(74) *Attorney, Agent, or Firm* — Oblon, McClelland, Maier & Neustadt, L.L.P.

(57) ABSTRACT

A vibration test jig includes: a base installed on a vibration table, including a mounting surface on which the end of the test body is mounted; a top plate placed on the base with a gap therebetween, including a slot having an inner surface that presses the end of the test body toward the mounting surface; a reinforcing portion placed along the slot; and pressing members arranged along the slot and configured to press the reinforcing portion toward the base. A thickness of the reinforcing portion varies along the slot in accordance with a magnitude of a fluctuating load generated in the top plate during vibration thereof.

4 Claims, 3 Drawing Sheets

VIBRATION TEST JIG

CROSS REFERENCE TO RELATED APPLICATIONS

This application is a continuation application of International Application No. PCT/JP2022/034877, now WO 2023/135865 A1, filed on Sep. 20, 2022, which claims priority to Japanese Patent Application No. 2022-004180, filed on Jan. 14, 2022, the entire contents of which are incorporated by reference herein.

TECHNICAL FIELD

The present disclosure relates to a vibration test jig that holds an end of a test body extending in a predetermined direction, such as a fan blade used in aircraft engines.

BACKGROUND ART

A vibration test is one of the tests for evaluating the fatigue properties of a test body. In the vibration test, a test body is vibrated to be applied with constant stress. Generally, fatigue when the number of times leading to damage such as rupture (i.e., the number of cycles to rupture) is less than a predetermined value (e.g., 104 times)) is called low-cycle fatigue, and fatigue when this number exceeds the predetermined value (e.g., 104 times) is called high-cycle fatigue. To assess the correlation between stress and the number of cycles to rupture, it is necessary to vibrate the test body for a long period of time, and the test duration often ranges from several days to several weeks.

WO 2020/208925 A1 (PLT 1) discloses a vibration test jig for a rotor blade, which is attached to a vibration table of a vibration test apparatus. The jig of Patent Literature 1 includes a top plate and a jig body as a base fixed to a vibration table. The rotor blade is placed on a mounting base of the jig body with a root portion thereof positioned in a holding groove of the top plate. In addition, bolts are screwed into the jig body through the top plate. By tightening these bolts, the top plate moves toward the jig body, and as a result, the root portion is pressed against the mounting base. As a result, the root portion is held by the jig, and the vibration test can be performed.

SUMMARY OF THE INVENTION

In the vibration test jig according to PLT 1, the rotor blade is held by a load which is applied to the root portion of the rotor blade from the top plate toward the base. This load value is set depending on to the operating environment of the test body. For example, since the test body of Patent Literature 1 is a rotor blade, a very large load (e.g., 20 t) equivalent to centrifugal force is applied to the root portion of the rotor blade. Therefore, the same large load is applied to the jig as the reaction force.

While the test body is vibrated, the load applied to the jig varies with the vibration of the test body. In the case of a generally twisted test body such as a rotor blade, the fluctuating load during vibration varies depending on the position in the jig. That is, the position where the fluctuating load is large and the position where the fluctuating load is small appear regularly. On the other hand, as described above, the vibration test is performed continuously for several days to several weeks. Therefore, plastic deformation is likely to occur where the fluctuating load is relatively large. When such fatigue such as plastic deformation occurs partially, it would become difficult for the jig to apply a uniform load (pressing) to the end of the test body. In addition, the product life (usable period) of the jig would be also shorten.

The present disclosure has been made in view of the above-mentioned circumstances, and it is an object of the present disclosure to provide a vibration test jig, which is capable of reducing an excessive fluctuating load generated in the jig during vibration of the test body.

A vibration test jig according to one aspect of the present disclosure is a jig for holding an end of a test body extending in a predetermined direction. The jig includes: a base installed on a vibration table, including a mounting surface on which the end of the test body is mounted; a top plate placed on the base with a gap therebetween, including a slot having an inner surface that presses the end of the test body toward the mounting surface; a reinforcing portion placed on the top plate along the slot; and pressing members arranged along the slot and configured to press the reinforcing portion toward the base; wherein a thickness of the reinforcing portion varies along the slot in accordance with a magnitude of a fluctuating load generated in the top plate during vibration thereof.

The reinforcing portion may be divided into reinforcing segments for each of the pressing members. The jig may include a plate member sandwiched between each of the pressing members and the reinforcing portion. The plate member may have a lower rigidity than a rigidity of the reinforcing portion.

According to the present disclosure, it is possible to provide a vibration test jig, which is capable of reducing an excessive fluctuating load generated in the jig during vibration of a test body.

DESCRIPTION OF EMBODIMENTS

Figure 1:
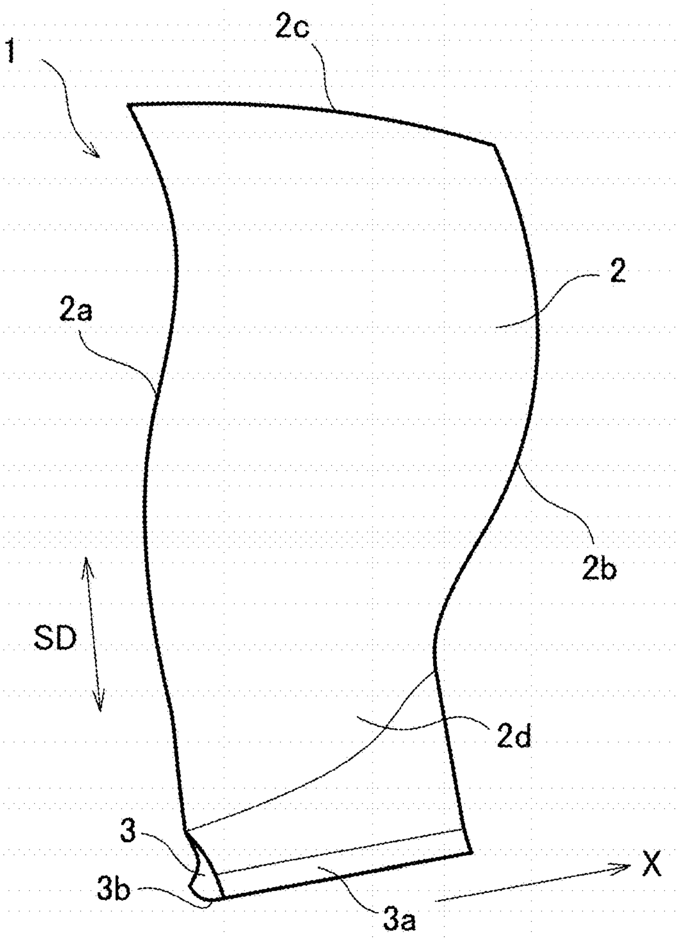
FIG. 1 is a perspective view of a fan blade as an example of a test body held in a jig according to the embodiment of the present disclosure.

Hereinafter, a jig 10 according to an embodiment of the present disclosure will be described with reference to the drawings. FIG. 1 is a perspective view of a fan blade 1 which is an example of a test body will be held in the jig 10. FIG.

Figure 2:
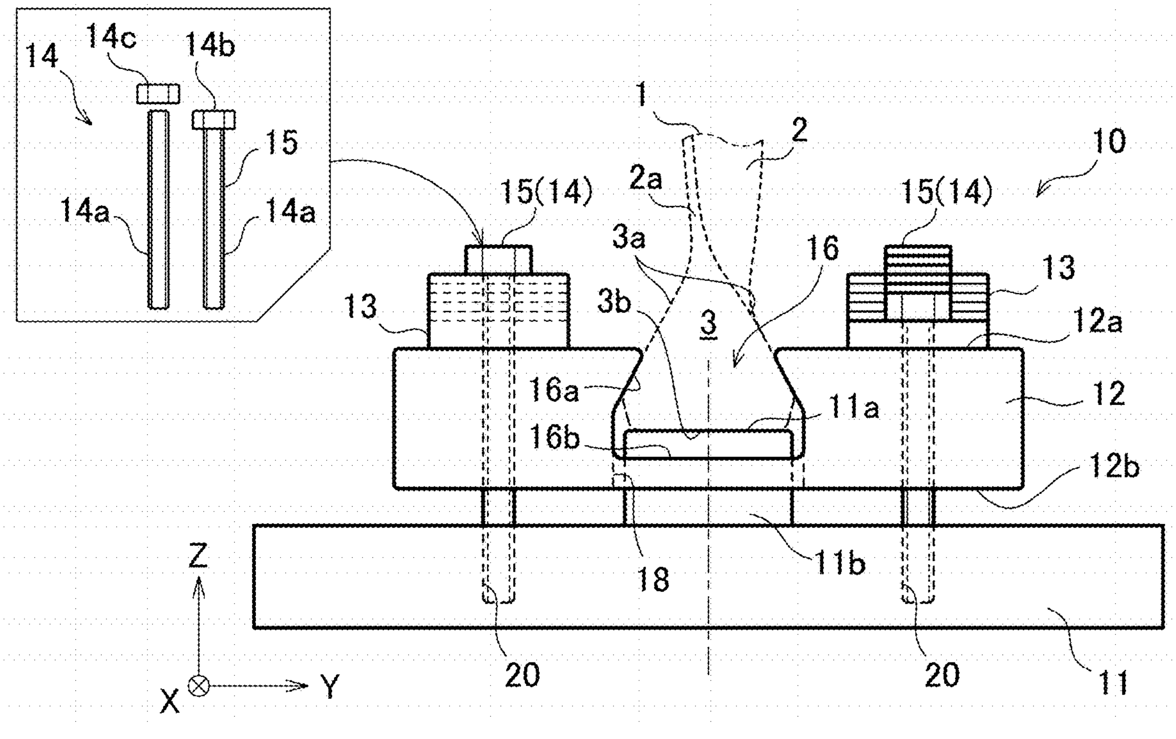
FIG. 2 is a front view of the jig according to the embodiment of the present disclosure.
Figure 3:
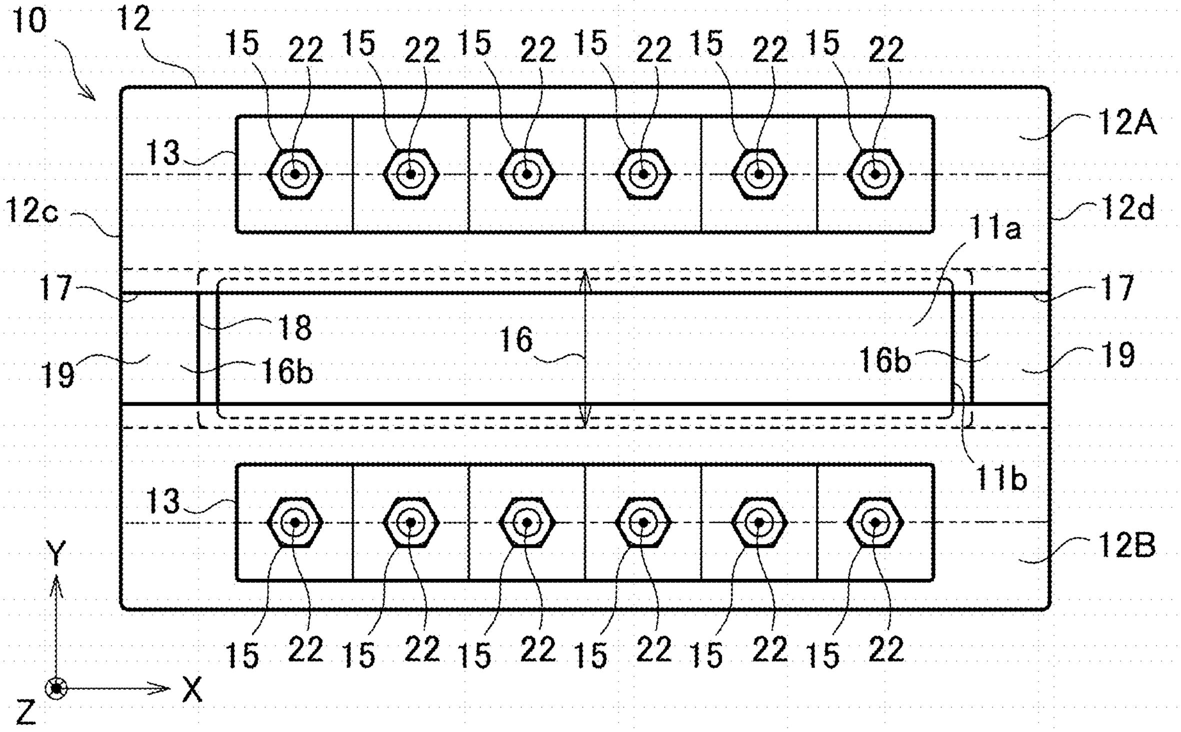
FIG. 3 is a top view of the jig according to the embodiment of the present disclosure.

2 is a front view of the jig 10 according to the present embodiment. FIG. 3 is a top view of the jig 10. For convenience of explanation, the illustration of a base 11 and a root portion 3 shown in FIG. 2 is omitted in in FIG. 3. Common parts in each figure are denoted by the same reference numerals, and duplicate explanations are omitted.

For convenience of explanation, X, Y and Z directions orthogonal to each other are defined. The X and Y directions are parallel to a plane (virtual plane) including the vibration direction of the vibration table (not shown). The X direction is an extending direction of a slot 16 (see FIG. 3) and also a direction from a side surface 12*c* to a side surface 12*d* of a top plate 12 in parallel with the slot 16. The Z direction is orthogonal to the X direction and the Y direction. The respective thicknesses described later shall refer to the thickness (length) along the Z direction.

The jig 10 according to the present embodiment is a vibration test jig. The jig 10 is mounted on a vibration table (not shown) of the vibration test apparatus and holds an end of a test body. The end of the test body has a cross-sectional shape that is pressed against the base 11 by the top plate 12. The test body is a so-called long piece and has an end that extends in the X direction and a body that extends from the end in a predetermined direction (e.g., Z direction) that crosses the X-Y plane. A fan blade 1 used in an aircraft engine such as a turbofan engine (not shown) will be described below as an example of the test body.

As shown in FIG. 1, the fan blade 1 as the test body includes a blade body 2 as a main body of the test body and a root portion 3 as an end of the test body. The blade body 2 and the root portion 3 are integrally formed. The blade body 2 has a leading edge 2*a*, a trailing edge 2*b*, a tip 2*c*, and a hub 2*d*. The blade body 2 extends from the root portion 3 to the tip 2*c* via the hub 2*d* in a span direction SD.

The root portion 3 is connected to the hub 2*d* of the blade body 2 and extended in one direction to be fit into a groove (dovetail groove) of a rotor (not shown) to which the fan blade 1 is attached. The extending direction of the root portion 3 may coincide with the X direction.

The root portion 3 is mounted on the mounting surface 11*a* of the base 11 (see FIG. 2). The root portion 3 has a pair of side surfaces 3*a* and 3*a* (see FIG. 2) and a bottom surface 3*b* (see FIG. 2). The root portion 3 has a cross-sectional shape complementary to the cross-sectional shape of the groove portion (not shown). That is, the root portion 3 includes a width that extends in the Y direction as it moves away from the blade body 2. A pair of side surfaces 3*a* and 3*a* are slopes defining this width. The bottom surface 3*b* is located between the side surfaces 3*a* and 3*a* and connects to each side surface. When the root portion 3 is mounted on the mounting surface 11*a* of the base 11, the bottom surface 3*b* contacts the mounting surface 11*a*.

As shown in FIGS. 2 and 3, the jig 10 includes a base 11, a top plate 12, reinforcing portions 13, and pressing members 14. Each pressing member 14 is composed of a bolt 15 formed integrally with a screw part 14*a* and a head part 14*b*. Alternatively, the pressing member 14 may be composed of a screw part 14*a* formed as a stud bolt and a nut 14*c* screwed into the screw part 14*a* (see FIG. 2). By tightening the bolt 15 in the former case and the nut 14*c* in the latter case, each reinforcing portion 13 is pressed toward the base 11. Hereinafter, for convenience of explanation, the bolt 15 will be described as an example of the pressing member 14.

The base 11 is a flat plate having a predetermined thickness and is formed of a metal having high rigidity such as stainless steel. The thickness of the base 11 is set to a value to obtain sufficient rigidity against the axial force of the bolt 15 during fastening and the stress during vibration. The base 11 is installed on a vibration table (not shown) of the vibration test apparatus and is fixed thereto by a fastening member such as a bolt in a state where the direction of the base 11 is adjusted to obtain a desired vibration direction.

The base 11 includes a mounting surface 11*a* on which the root portion 3 is mounted. The mounting surface 11*a* faces the top plate 12. For example, the mounting surface 11*a* is formed as an upper surface of the mounting stage 11*b* projecting from the base 11 toward the top plate 12. The height of the mounting stage 11*b* according to the present embodiment is set to a value capable of maintaining a gap between the base 11 and the top plate 12 when the top plate 12 presses the root portion 3 against the mounting surface 11*a*.

The top plate 12 is a rectangular flat plate having a predetermined thickness. The top plate 12 is placed on the base 11 with a gap therebetween. Similar to the base 11, the top plate 12 is formed of a metal having high rigidity such as stainless steel. The thickness of the top plate 12 is set to a value to obtain sufficient rigidity against the axial force of the bolt 15 during fastening and the stress during vibration. The shape of the top plate 12 is not limited to a rectangular shape and may be a circular shape or the like.

The top plate 12 has a slot (holding groove) 16 in which at least a part of the root portion 3 is accommodated. The slot 16 opens on the upper surface 12*a* of the top plate 12 and extends in the X direction. The slot 16 also opens on at least one of the side surfaces 12*c* and 12*d* (see FIG. 3) of the top plate 12 as an insertion port 17 of the root portion 3. In the example shown in FIG. 3, the slot 16 extends from one of the side surfaces 12*c* and 12*d* of the top plate 12 to the other of them. In this case, each of the side surfaces 12*c* and 12*d* of the top plate 12 is provided with the insertion port 17.

The slot 16 also opens on the lower surface 12*b* of the top plate 12 as an insertion port 18 of the mounting stage 11*b*. The insertion port 18 penetrates from the bottom surface 16*b*, which is a part of the inner surface 16*a* of the slot 16, to the lower surface 12*b* of the top plate 12.

The slot 16 has an inner surface 16*a* for pressing the root portion 3 located in the slot 16 toward the mounting surface 11*a*. That is, the cross section of the slot 16 orthogonal to the X direction includes an outline corresponding to the side surfaces 3*a* and 3*a* of the root portion 3 located in the slot 16. As a result, a part of the inner surface 16*a* contacts the pair of side surfaces 3*a* and 3*a* of the root portion 3.

The depth of the slot 16 along the Z direction is deeper than the length of a part of the root portion 3 along the Z direction, the part being accommodated in the slot 16. Further, the width of the bottom surface 16*b* of the slot 16 along the Y direction is wider than the width of the root portion 3 along the Y direction. Thus, when the root portion 3 is inserted into the slot 16 through the insertion port 17, a sufficient gap is formed between the root portion 3 and the inner surface 16*a* of the slot 16, and the root portion 3 can be easily inserted into the slot 16.

Portions each including the bottom surface 16*b* and extending in the Y direction function as link portions 19 linking between a plate portion 12A on one side across the slot 16 and a plate portion 12B on the other side. Screw holes 20 (see FIG. 2) for screwing the bolts 15 are formed on both sides along the slot 16. The screw holes 20 are arranged in the X direction at predetermined intervals.

Each reinforcing portion 13 is a flat plate-like member (rod-like member) having a predetermined width in the Y direction and extending along the slot 16 (i.e., in the X direction). The reinforcing portion 13 is placed on each side across the slot 16. The reinforcing portion 13 is provided with through holes 21 (see FIG. 4B) through which the bolts 15 are inserted. The through holes 21 are arranged in the X direction at predetermined intervals. This interval is equal to the interval of the screw holes 20 adjacent in the X direction. The reinforcing portion 13 is made of a metal material that is more rigid than the top plate 12. Such a material is, for example, chromium molybdenum steel (SCM).

The bolts 15 are arranged in the X direction on the reinforcing portion 13 and are screwed to the base 11 through the reinforcing portion 13 and the top plate 12. When each bolt 15 is tightened, the top plate 12 moves toward the base 11. Therefore, when the bolt 15 is tightened while the root portion 3 has been inserted into the slot 16 and placed on the mounting stage 11*b*, the top plate 12 gradually descends, and the inner surface 16*a* of the slot 16 contacts the side surfaces 3*a* and 3*a* of the root portion 3. On the other hand, the root portion 3 cannot descend because it is placed on the mounting stage 11*b*. Therefore, when the bolt 15 is tightened further, the inner surface 16*a* of the slot 16 presses the side surfaces 3*a* and 3*a* of the root portion 3, and the root portion 3 is pressed against the mounting surface 11*a* of the mounting stage 11*b*. Thus, the fan blade 1 is held by the jig 10.

A strain sensor 22 is embedded in each bolt 15. The strain sensor 22 measures the axial force generated in the bolt 15. When the bolt 15 is tightened, a constant axial force can be set for each bolt 15 by confirming the axial force measured by the strain sensor 22. Therefore, a uniform load can be applied to the root portion 3 and the jig 10.

However, the load applied to the jig 10 varies periodically in accordance with the vibration of the fan blade 1. In addition, when a test body such as the fan blade 1 whose overall shape is twisted around the extending direction is vibrated, the maximum value of the fluctuating load varies with each position in the jig 10. As described above, plastic deformation is likely to occur at a position where the fluctuating load is relatively large in the jig 10. Further, the application of a uniform load to the root portion 3 by the jig 10 would become difficult, and the product life (usable period) of the jig 10 would be also shortened.

Therefore, in the present embodiment, the thickness t of the reinforcing portion 13 varies along the slot 16 in accordance with the magnitude of the fluctuating load generated in the top plate 12 when the fan blade 1 is vibrated. That is, the distribution of the fluctuating load generated in the top plate 12, when the fan blade 1 is held by a jig 10 having a configuration other than the reinforcing portion 13 and vibrated, is calculated in advance. Next, the thickness t of the reinforcing portion 13 is set in accordance with the magnitude of the fluctuating load at each position along the slot 16 (e.g., each position of the bolt 15) in the calculated distribution. Accordingly, the larger the fluctuating load is in the region where the reinforcing portion 13 is placed, the greater the thickness of the reinforcing portion 13 at that position. The distribution of the magnitude of the fluctuating load may be calculated by an analytical method such as numerical analysis using the finite element method, or may be calculated from the measured value by the strain sensor 22.

Figure 4A:
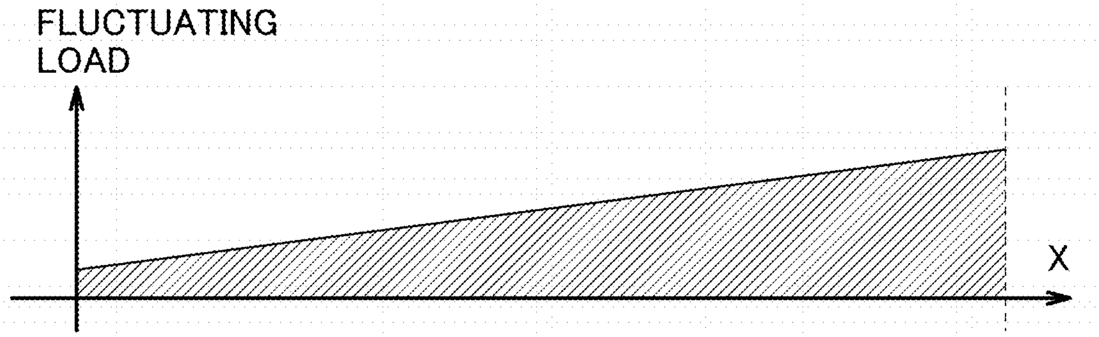
FIG. 4A is a graph showing fluctuating loads at positions along the X direction in a region where a reinforcing portion according to the embodiment of the present disclosure is placed.
Figure 4B:
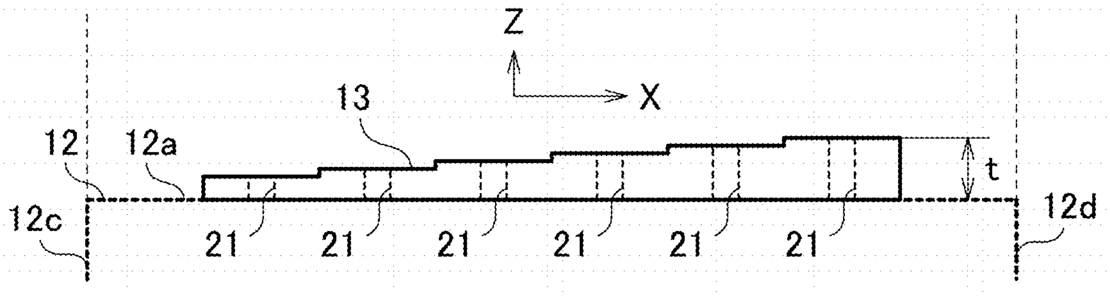
FIG. 4B is a side view of the reinforcing portion having a thickness set based on the graph of FIG. 4A.
Figure 5A:
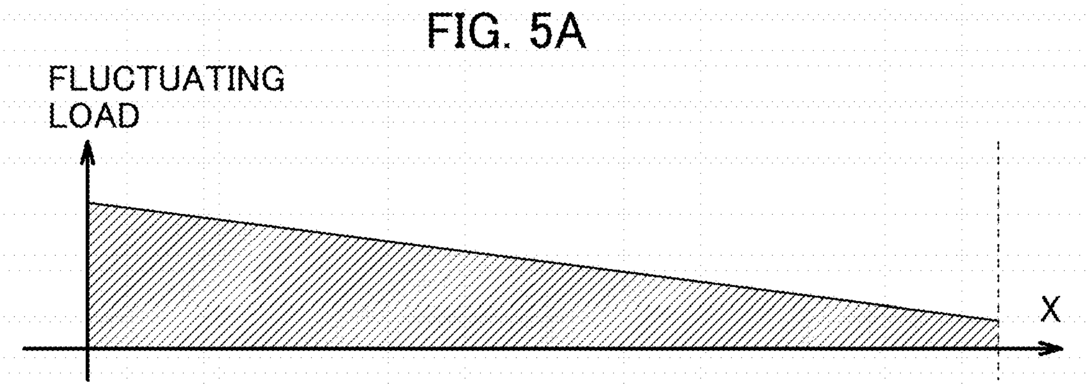
FIG. 5A is a graph showing fluctuating loads at positions along the X direction in a region where a reinforcing portion according to the embodiment of the present disclosure is placed.
Figure 5B:
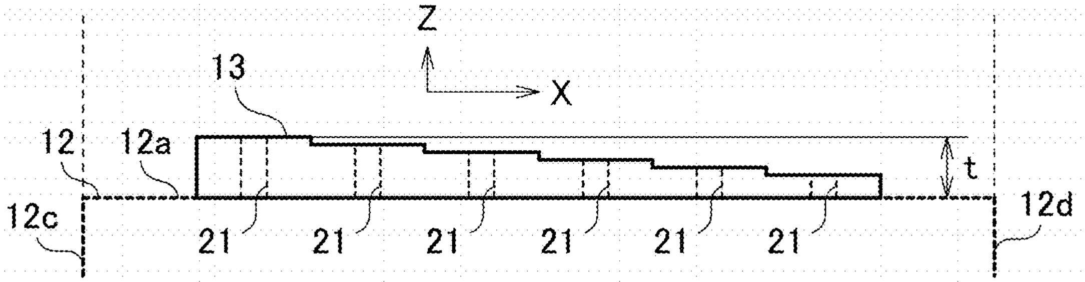
FIG. 5B is a side view of the reinforcing portion having a thickness set based on the graph of FIG. 5A.

FIGS. 4A to 5B are views for explaining the setting of the thickness t of the reinforcing portion 13. FIGS. 4A and 5A are graphs showing examples of fluctuating loads at positions along the X direction in the region where the reinforcing portion 13 is mounted. FIG. 4B is a side view of the reinforcing portion 13 having a thickness set based on the graph of FIG. 4A. FIG. 5B is a side view of the reinforcing portion 13 having a thickness set based on the graph of FIG. 5A.

As shown in FIG. 4A, when the maximum value of the fluctuating load at one position increases as the position advances in the X direction, the thickness t of the reinforcing portion 13 at one position also increases as the position advances in the X direction, as shown in FIG. 4B. The thickness of the top plate 12 may increase stepwise or continuously with each position of the through hole 21, as shown in FIG. 4A. In either case, the portion where the head part 14*b* of the bolt 15 contacts is formed as a plane orthogonal to the insertion direction of the bolt 15 (the direction opposite to the Z direction in the present embodiment).

As shown in FIG. 5A, if the maximum value of the fluctuating load at a position decreases as the position advances in the X direction, the thickness t of the reinforcing portion 13 at a position also decreases as the position advances in the X direction, as shown in FIG. 5B. However, as described above, the thickness of the top plate 12 may decrease stepwise or continuously with each position of the through hole 21, as shown in FIG. 5A.

The distribution of the maximum value of the fluctuating load along the X direction varies depending on the shape, size, and material of the fan blade 1 (i.e., the test body) held in the jig 10, or the direction of vibration relative to the fan blade 1, etc. Accordingly, the thickness t of the reinforcing portion 13 at each position along the X direction is also set. Therefore, the variation in the thickness t of the reinforcing portion 13 at each position along the X direction is not limited to a monotonic increase or a monotonic decrease.

According to the present embodiment, by placing the reinforcing portion 13 on the top plate 12, it is possible to increase the rigidity at the positions where the fluctuating loads are large. Therefore, it is possible to reduce the excessive fluctuating load generated in the jig 10 when the test body is vibrated. As a result, the nonuniformity of the load distribution is also alleviated, the progress of local plastic deformation can be suppressed, and the uniform load (pressing) on the end of the test body can be maintained. That is, the shortening of the product life (usable period) of the jig 10 can be suppressed.

Figure 6:
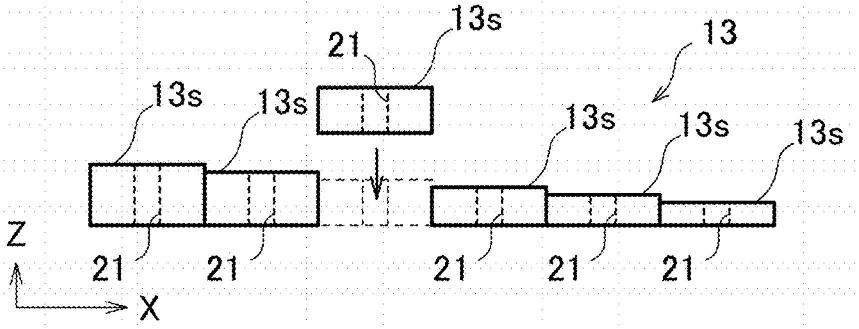
FIG. 6 is a side view of a modification of the reinforcing portion according to the embodiment of the present disclosure.

FIG. 6 is a side view of a modification of the reinforcing portion 13 according to the present embodiment. As shown in this figure, the reinforcing portion 13 may be divided into reinforcing segments 13S for each of the bolts 15 (pressing members 14). In this case, the reinforcing segments 13S having different thicknesses can be arranged according to the distribution of various fluctuating loads. For example, the reinforcing portion 13 having a thickness corresponding to the change of the vibration mode of the test body can be constructed by simply changing the arrangement of the reinforcing segments 13S.

Figure 7:
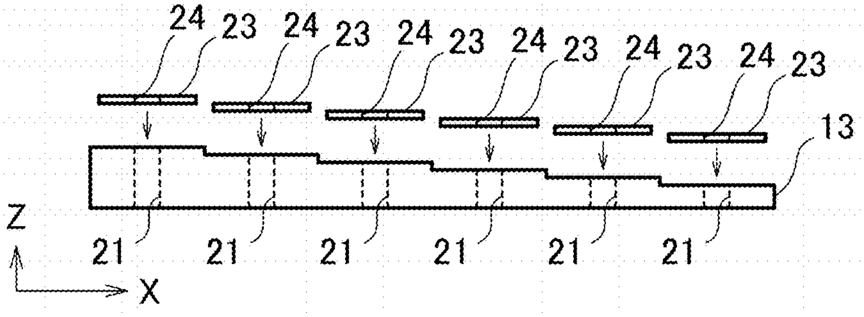
FIG. 7 is a side view of a washer according to the embodiment of the present disclosure.

FIG. 7 is a side view of the plate member 23 according to the present embodiment. The jig 10 according to the present embodiment may include a plate member 23 sandwiched between the bolt 15 (pressing member 14) and the reinforcing portion 13. The plate member 23 has an insertion hole 24 through which the screw part 14*a* is inserted, and is formed, for example, in an annular shape.

The rigidity of the plate member 23 is lower than that of the reinforcing portion 13, and is, for example, ½ or less of the rigidity of the reinforcing portion 13. As the material of the plate member 23, a light metal such as aluminum or magnesium, a hard rubber, a hard resin or the like is selected. The plate members of different materials may be used in overlapped manner.

When holding the fan blade 1, the bolts 15 are gradually tightened until a desired axial force is obtained while changing the bolt 15 to be tightened. At this time, in order to avoid that only a group of some bolts 15 that are close to each other are extremely tightened (so-called one-sided tightening), after one of the bolts 15 is tightened, the other of the bolts 15, which is sufficiently separated from the one bolt 15 already tightened, is tightened.

On the other hand, the base 11, the top plate 12, the reinforcing portion 13, and the pressing member 14 are formed of a metal having relatively high rigidity such as stainless steel, SCM or the like, in order to avoid excessive deformation by the load. Therefore, the axial force of each bolt 15 increases rapidly only by slightly tightening the bolt 15. In addition, the axial force of the adjacent bolt 15 may decrease due to the extreme increase of the axial force. That is, since the amount of the axial force increase per rotation of the bolt 15 is large, proper bolting is difficult, and the work to obtain the uniform axial force described above takes an enormous amount of time.

When the bolt 15 is tightened, the plate member 23 is sandwiched between the head part **14*b* and the reinforcing portion 13 of the bolt 15. Since the plate member 23 is softer than the reinforcing portion 13, the increase amount of axial force per rotation of the bolt 151 is reduced compared with the case where the plate member 23 is not provided. That is, the rotation angle of the bolt 15 for obtaining the desired amount of axial force increase can be enlarged. Accordingly, the axial force adjustment of the bolts 15 is facilitated, the work for obtaining uniform axial forces for the bolts 15 (pressing members 14) is eased, and the reinforcing portion 13 and the top plate 12 can be attached to the base 11** with appropriate axial forces.

It should be noted that the present disclosure is not limited to the foregoing embodiments, but is illustrated by the description of the claims, and further includes all changes within the meaning and scope of the description and uniformity of the claims.

What is claimed is:

1. A vibration test jig for holding an end of a test body extending in a predetermined direction, comprising:

a base installed on a vibration table, including a mounting surface on which the end of the test body is mounted;

a top plate placed on the base with a gap therebetween, including a slot having an inner surface that presses the end of the test body toward the mounting surface;

a reinforcing portion placed on the top plate along the slot; and pressing members arranged along the slot and configured to press the reinforcing portion toward the base; wherein a thickness of the reinforcing portion varies along the slot in accordance with a magnitude of a fluctuating load generated in the top plate during vibration thereof.

2. The vibration test jig according to claim 1, wherein the reinforcing portion is divided into reinforcing segments for each of the pressing members.

3. The vibration test jig according to claim 1, comprising a plate member sandwiched between each of the pressing members and the reinforcing portion; wherein the plate member has a lower rigidity than a rigidity of the reinforcing portion.

4. The vibration test jig according to claim 2, comprising a plate member sandwiched between each of the pressing members and the reinforcing portion; wherein the plate member has a lower rigidity than a rigidity of the reinforcing portion.

* * * * *